United States Patent [19]

Miyakubo et al.

[11] Patent Number: 5,245,961
[45] Date of Patent: Sep. 21, 1993

[54] FRONT COVER ARRANGEMENT IN TRANSVERSELY MOUNTED TYPE INTERNAL COMBUSTION ENGINE

[75] Inventors: Hiroshi Miyakubo; Takao Kubozuka, both of Kanagawa, Japan

[73] Assignee: Nissan Motor Co., Ltd., Japan

[21] Appl. No.: 4,036

[22] Filed: Jan. 15, 1993

[30] Foreign Application Priority Data

Jan. 27, 1992 [JP] Japan .................................. 4-12146

[51] Int. Cl.5 ........................................... F02B 77/00
[52] U.S. Cl. ............................... 123/195 C; 123/198 E
[58] Field of Search ............ 123/195 C, 198 E, 195 A

[56] References Cited

U.S. PATENT DOCUMENTS

| | | | |
|---|---|---|---|
| 4,327,679 | 5/1982 | Crouch et al. | 123/195 C |
| 4,508,072 | 4/1985 | Takami et al. | 123/198 E |

Primary Examiner—Noah P. Kamen
Attorney, Agent, or Firm—Lowe, Price, LeBlanc & Becker

[57] ABSTRACT

A front cover has at a front surface central portion thereof an integral mounting seat for installation of a mounting bracket and at a rear surface central portion thereof an integral boss adapted to extend between the mounting seat and a front end of a cylinder head and cylinder block assembly. The boss is fastened together with the mounting bracket to the front end of the cylinder head and cylinder block assembly. A resilient sealing member is interposed between the peripheral end of the front cover and the front end of the cylinder head and cylinder block assembly such that the front cover is supported rigidly at the boss together with the mounting bracket and resiliently at the peripheral end upon the front end of the cylinder head and cylinder block assembly.

12 Claims, 6 Drawing Sheets

FRONT COVER ARRANGEMENT IN TRANSVERSELY MOUNTED TYPE INTERNAL COMBUSTION ENGINE

BACKGROUND OF THE INVENTION

Field of the Invention

The present invention relates to a front cover arrangement in a transversely mounted type internal combustion engine.

Disclosure Information

A prior art front cover for a transversely mounted type internal combustion engine is made up of two separate parts so that an engine mounting bracket, which is directly fastened to a cylinder head and cylinder block assembly, can be placed between the two parts. Due to this, the prior art front cover has a problem of a complicated structure and a high manufacturing and assembling cost. Another problem is that the front cover is liable to vibrate at its central portion since it is supported only at its outer peripheral wall. A further problem is the necessity of a number of particular bolts for fastening the outer peripheral wall to the front end of the cylinder head and cylinder block assembly for thereby preventing loosening of the front cover in spite of vibrations of the engine, thus causing a high cost. Further, in the prior art engine front end arrangement, the engine mounting bracket may possibly be encountered by design restrictions due to a power transmitting mechanism such as a camshaft driving mechanism, etc.

SUMMARY OF THE INVENTION

According to an aspect of the present invention, there is provided an improved front cover arrangement for an internal combustion engine. The engine has a cylinder head and cylinder block assembly and a power transmitting mechanism at a front end of the cylinder head and cylinder block assembly. The cylinder head and cylinder block assembly is adapted to be supported at the front end by means of a mounting bracket. The front cover arrangement comprises a front cover for attachment to the front end of the cylinder head and cylinder block assembly for covering the power transmitting mechanism. The front cover has at a front surface central portion thereof an integral mounting seat for installation of the mounting bracket and at a rear surface central portion thereof an integral boss extending between the mounting seat and the front end of the cylinder head and cylinder block assembly. The front cover arrangement further comprises bolting means for bolting the boss to the front end of the cylinder head and cylinder block assembly for thereby fastening the front cover to same together with the mounting bracket.

According to another aspect of the present invention, there is provided an improved front cover arrangement in a transversely mounted type internal combustion engine. The front cover arrangement comprises a cylinder head and cylinder block assembly of the engine, a power transmitting mechanism at a front end of the cylinder head and cylinder block assembly, a mounting bracket for installation on the front end of the cylinder head and cylinder block assembly, a front cover attached to the front end of the cylinder head and cylinder block assembly for covering the power transmitting mechanism, the front cover having at a front surface central portion thereof an integral mounting seat on which the mounting bracket is installed and at a rear surface central portion thereof an integral boss extending between the mounting seat and the front end of the cylinder head and cylinder block assembly, and bolting means for bolting the boss to the front end of the cylinder head and cylinder block assembly for thereby fastening the front cover to same together with the mounting bracket.

According to a further aspect of the present invention, there is provided an improved front cover arrangement in a transversely mounted type internal combustion engine. The front cover arrangement comprises a cylinder head and cylinder block assembly of the engine, a power transmitting mechanism at a front end of the cylinder head and cylinder block assembly, a mounting bracket for installation on the front end of the cylinder head and cylinder block assembly, a front cover attached to the front end of the cylinder head and cylinder block assembly for covering the power transmitting mechanism, the front cover having at a front surface central portion thereof an integral mounting seat on which the mounting bracket is installed and at a rear surface central portion thereof a first integral boss extending between the mounting seat and the front end of the cylinder head and cylinder block assembly and a second integral boss extending between a front surface central portion of the front cover other than that formed with the mounting seat and the front end of the cylinder head and cylinder block assembly, a resilient member interposed between a peripheral end of the front cover and the front end of the cylinder head and cylinder block assembly, and bolting means for bolting the first and second bosses together with the mounting bracket to the front end of the cylinder head and cylinder block assembly for thereby supporting the front cover rigidly at the first and second bosses together with the mounting bracket and resiliently at the peripheral end upon the front end of the cylinder head and cylinder block assembly.

According to a further aspect of the present invention, there is provided an improved front cover arrangement in a transversely mounted internal combustion engine. The arrangement comprises a cylinder head and cylinder block assembly of the engine, a power transmitting mechanism at a front end of the cylinder head and cylinder block assembly, a mounting bracket for installation on the front end of the cylinder head and cylinder block assembly, a front cover attached to the front end of the cylinder head and cylinder block assembly for covering the power transmitting mechanism, the front cover having at a front surface central portion thereof an integral mounting seat on which the mounting bracket is installed and at a rear surface central portion thereof a plurality of integral bosses extending between the mounting seat and the front end of the cylinder head and cylinder block assembly, a resilient member interposed between a peripheral end of the front cover and the front end of the cylinder head and cylinder block assembly, first bolting means for bolting the mounting bracket to the mounting seat, and second bolting means for bolting the bosses to the front end of the cylinder head and cylinder block assembly for thereby supporting the front cover rigidly at the bosses together with the mounting bracket and resiliently at the peripheral end upon the front end of the cylinder head and cylinder block assembly.

The above arrangements are effective for solving the above noted problems inherent in the prior art devices.

It is accordingly an object of the present invention to provide a novel and improved front cover for a transversely mounted type internal combustion engine which is simple in structure and can reduce the manufacturing and assembling expense.

It is a further object of the present invention to provide a novel and improved front cover arrangement in a transversely mounted type internal combustion engine which can eliminate or at least reduce the film vibration of the front cover for thereby reducing the engine noise.

It is a further object of the present invention to provide a novel and improved front cover arrangement of the foregoing character which can reduce the transmission of vibration from the engine to the front cover for thereby reducing, together with the effect of elimination or reduction of the membrane vibration of the front cover, the sounding of the front cover.

It is a further object of the present invention to provide a novel and improved front cover arrangement of the foregoing character which can increase the freedom of design of a mounting bracket.

DETAILED DESCRIPTION OF THE PREFERRED EMBODIMENTS

Figure 1:
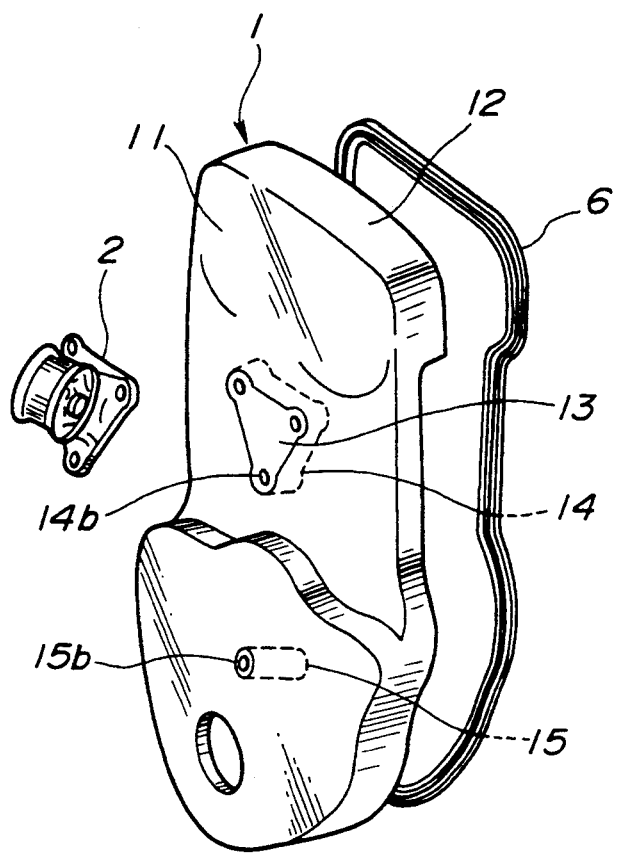
FIG. 1 is a perspective view of a front cover arrangement according to an embodiment of the present invention.

Referring first to FIGS. 1 through 5, a front cover unit according to an embodiment of the present invention consists of a front cover 1, an engine mounting bracket 2 and a resilient sealing member 6.

The front cover 1 includes a front wall 11 and an outer peripheral wall 12 so as to cover a power transmitting mechanism 5 such as a camshaft driving mechanism, etc. at a front end of a cylinder head and cylinder block unit 3.

The engine mounting bracket 2 is fastened to the front cover 1 and used for supporting the engine on a vehicle body side bracket (not shown) by way of an insulator 17.

Figure 2:
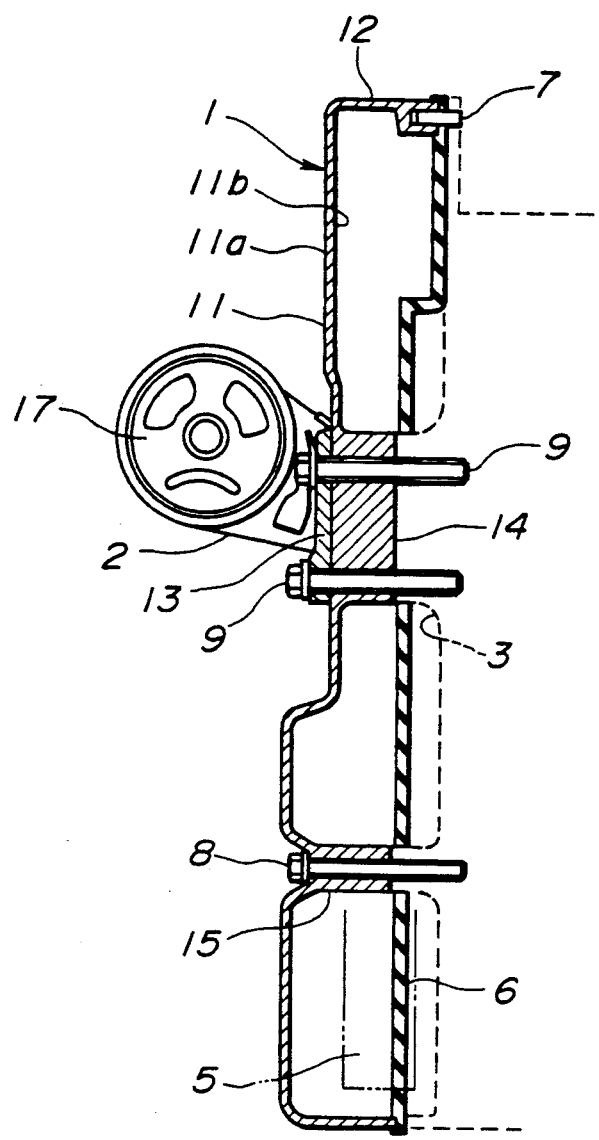
FIG. 2 is a sectional view of the front cover arrangement of FIG. 1.
Figure 3:
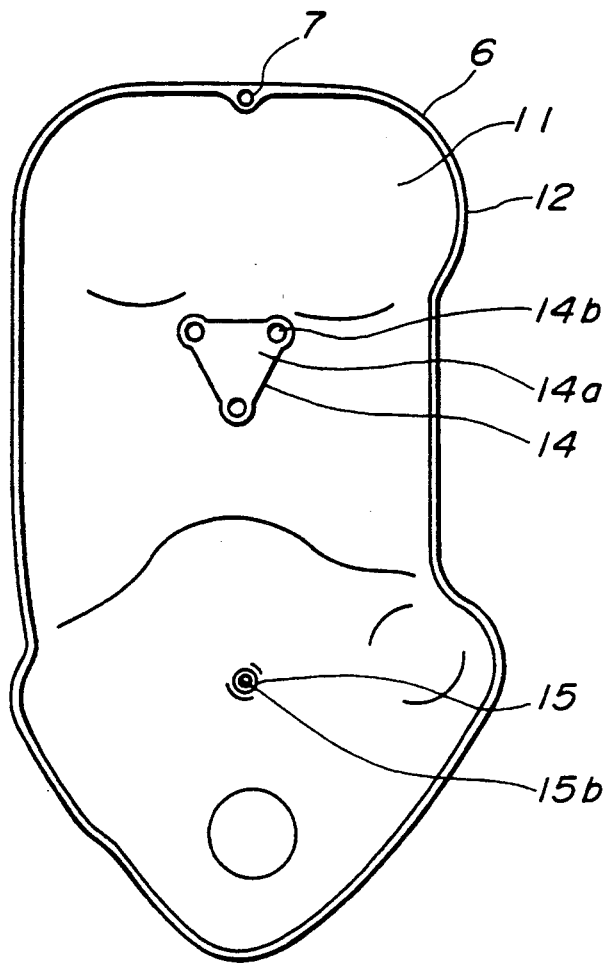
FIG. 3 is a rear view of a front cover of FIG. 1.

As seen from FIGS. 2 and 3, the front cover 1 has at a front surface central portion thereof an integral mounting seat 13 and at a rear surface central portion thereof a first integral boss 14 extending between the mounting seat 13 and the front end of the cylinder head and cylinder block assembly 3. The front cover 1 further has a second integral boss 15 located below the first boss 14 and extending between the front surface central portion other than that formed with the mounting seat 13 and the front end of the cylinder head and cylinder block assembly 3.

In other words, the first and second bosses 14 and 15 protrude rearwardly from the central portion of the rear surface 11b for joining with the front end of the cylinder head and cylinder block assembly 3. The first boss 14 has a triangular prism-like shape and has at the rear end a joining surface 14a for joining with the front end of the cylinder head and cylinder block assembly 3 and at the front end the mounting seat 13. The first boss 14 further has three bolt holes 14b for installation of bolts 9.

The engine mounting bracket 2 is adapted to be installed on the mounting seat 13 and fastened with bolts 9 to the front end of the cylinder head and cylinder block assembly 3 by interposing therebetween the first boss 14. To this end, the bolts 9 are adapted to pass through bolt holes (no numeral) of the mounting bracket 2 and the bolt holes 14b of the first boss 14 and be screwed into the front end of the cylinder head and cylinder block assembly 3.

The second boss 15 is located below the first boss 14 and has a bolt hole 15b. A single bolt 8 is adapted to be installed in the bolt hole 15b of the second boss 15 to pass therethrough and be screwed into the front end of the cylinder head and cylinder block assembly 3 for fastening the front cover 1 to same.

A single knock pin 7 is provided between the peripheral wall 12 of the front cover 1 and the front end of the cylinder head and cylinder block assembly 3 for positioning the front cover 1 with respect to the front end of the cylinder head and cylinder block assembly 3. In installation of the front cover 1, the front cover 1 is first fastened with the bolt 8 at the second boss 15 to the front end of the cylinder head and cylinder block assembly 3 whilst being positioned with respect to the front end of the cylinder head and cylinder block assembly 3 by means of the single knock pin 7, and thereafter fastened with the bolts 9 at the first boss 14 to the front end of the cylinder head and cylinder block assembly 3.

Figure 4:
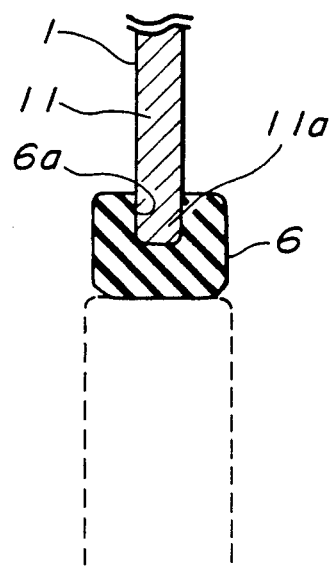
FIG. 4 is a fragmentary sectional view of the front cover arrangement of FIG. 1.

A resilient sealing member 6 is provided between the peripheral wall 12 of the front cover 1 and the front end of the cylinder head and cylinder block assembly 3. As shown in FIG. 4, the sealing member 6 has a channel-like cross section so as to receive in its recessed portion 6a the terminal end 12a of the peripheral wall 12.

The front cover 1 is made of a light alloy such as aluminum alloy, magnesium alloy, etc. and formed into a single piece.

The operation of the front cover of this invention will be described hereinbelow.

The mounting bracket 2 is fastened securely and rigidly to the engine block 3 by interposing therebetween the first boss 14 of the front cover 1, i.e., the first boss 14 is fastened securely to the front end of the cylinder head and cylinder block assembly 3 together with the mounting bracket 2. By this, it becomes possible to obtain a sufficient joint rigidity, improve the damping characteristic by the effect of the interposition of the front cover 1 between the mounting bracket 2 and the front end of the cylinder head and cylinder block assembly 3 and therefore reduce the transmissibility of engine vibration to the vehicle body.

With the structure in which the mounting bracket 2 is installed on the front cover 1 which is in turn installed on the cylinder head and cylinder block unit 3, it becomes possible to form the front cover 1 into an single piece and therefore increase the rigidity of the front cover 1 of itself.

Figure 5:
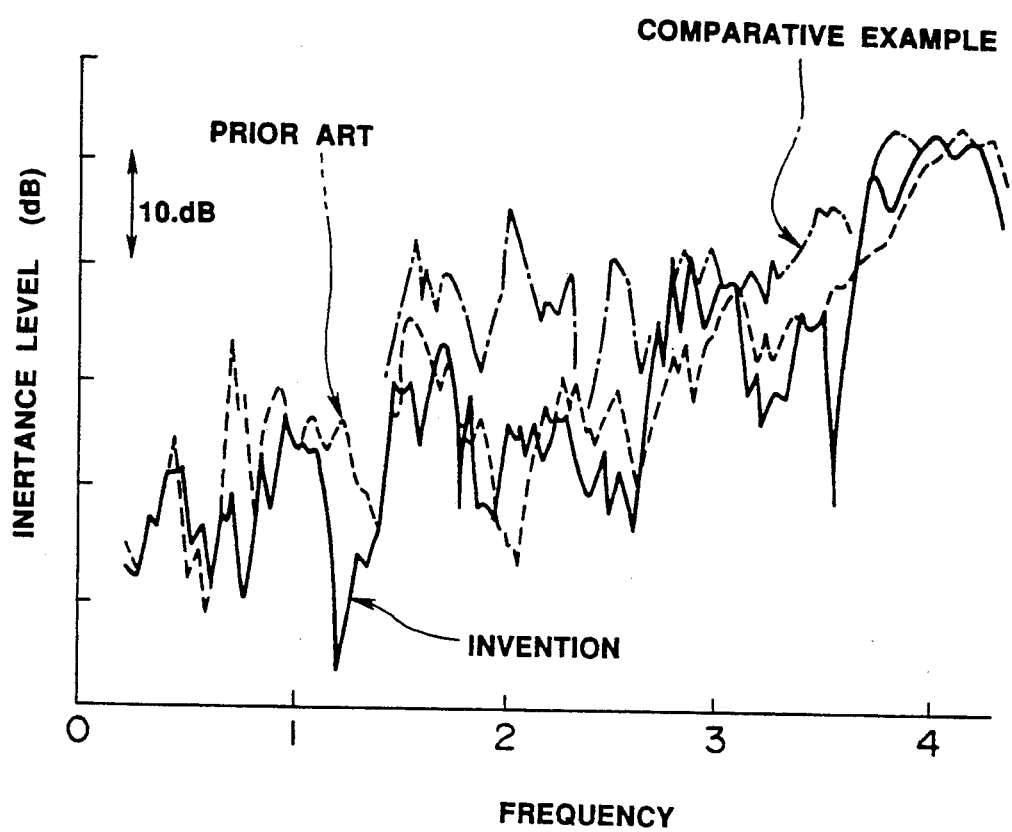
FIG. 5 is a vibration characteristic of the front cover arrangement of FIG. 1.

The front cover 1 is fastened at the first and second bosses 14 and 15 which are located at the central portion of the front wall 11, to the cylinder head and cylinder block unit 3 with a high rigidity whilst being resiliently supported at its peripheral end or peripheral wall 12 by way of the resilient seal member 6, thus making it possible to attain a good vibration characteristic as represented by the solid line in FIG. 5. The characteristic indicated by the one-dot chain line in FIG. 5 is what is obtained in the case the front cover 1 is rigidly fastened to the cylinder head and cylinder block unit 3 without interposing therebetween any resilient member, i.e., the front cover 1 is supported at its all supporting portions (i.e., the first and second bosses 14 and 15 and the peripheral wall 12) rigidly on the front end of the cylinder head and cylinder block assembly 3, whereas the characteristic indicated by the dotted line is what is obtained in the case the prior art front cover which is supported only at its peripheral portion rigidly on the front end of the cylinder head and cylinder block assembly.

Since the front cover 1 is adapted to be fastened at the first and second bosses 14 and 15, which are located at the central portion of the front wall 11, to the engine block 3 with a high rigidity, the front cover 1 cannot effect a fundamental vibration mode having an antinode at the central portion of the front wall 11 but a vibration mode of high degrees having nodes at the first and second bosses 14 and 15, thus making it possible to reduce the sounding effect at frequency band of 1-3 KHz where most problematic engine sounds are produced of thereby suppressing the engine noise.

The peripheral wall 12 is not adapted to be fastened with bolts but resiliently supported on the cylinder head and cylinder block 3 by way of the resilient sealing member 6. This is combined with the effect of the elimination or reduction of the film vibration of the front wall 11 to make it possible to reduce the sounding of the front cover 1 considerably.

Further, by the elimination of the particular fastening bolts otherwise necessitated in the prior art front cover for fastening of the peripheral wall of the front cover, it becomes possible not only to reduce the number of constituent parts but to reduce the manufacturing cost considerably.

Figure 6:
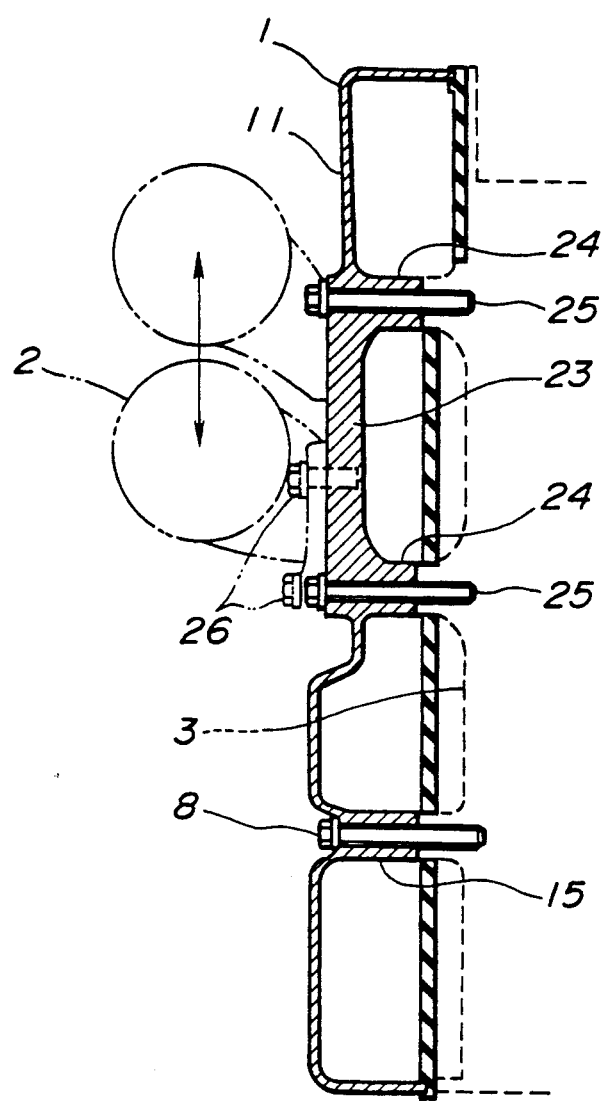
FIG. 6 is a sectional view of a front cover arrangement according to another embodiment of the present invention.
Figure 7:
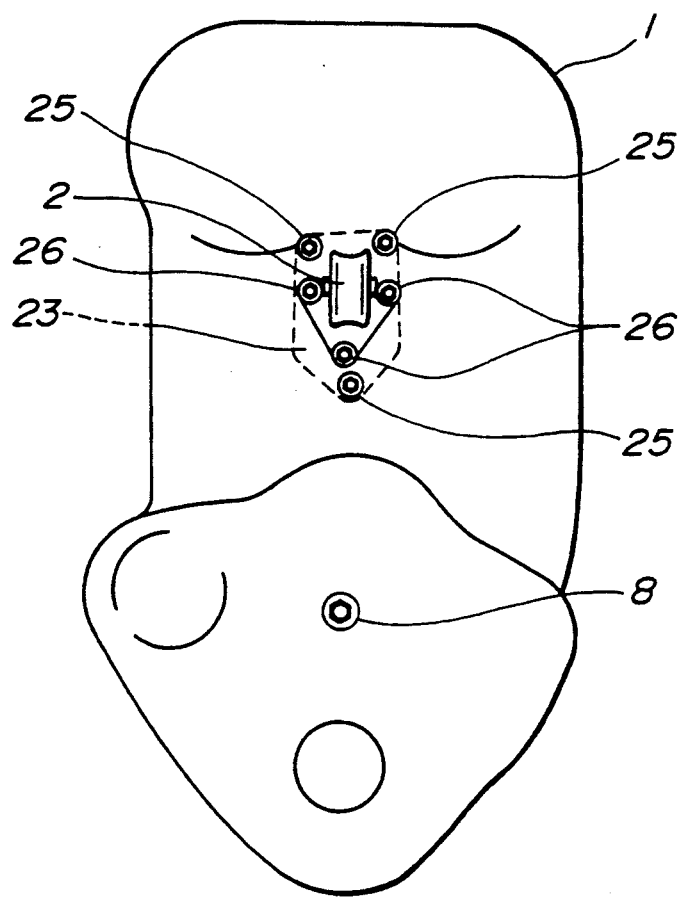
FIG. 7 is a front elevational view of the front cover arrangement of FIG. 6.

Referring now to FIGS. 6 and 7, another embodiment will be described. This embodiment differs from the previous embodiment in that the front cover 21 has three first bosses 24 for supporting a mounting seat 23 on the front end of the cylinder head and cylinder block assembly 3 and that the mounting bracket 2 is fastened with bolts 26 to the mounting seat 23 which is in turn fastened with bolts 25 and by way of the three first bosses 24 to the front end of the cylinder head and cylinder block assembly 3.

In this instance, as indicated by the arrow in the drawing, it becomes possible to change the position of the mounting bracket 2 relative to the mounting seat 23, thus making it possible to increase the freedom of arrangement of the mounting bracket 2 so that the mounting bracket 2 can be easily arranged at a position where it does not interfere with the power transmitting mechanism 5 such as a camshaft drive mechanism, etc.

In the meantime, depending on the position of the mounting bracket 2, some of the bolts 25 and 26 may be used commonly for fastening the mounting bracket 2 and the mounting seat 23 to the front end of the cylinder head and cylinder block assembly 3.

What is claimed is:

1. A front cover arrangement for an internal combustion engine having a cylinder head and cylinder block assembly and a power transmitting mechanism at a front end of the cylinder head and cylinder block assembly, the cylinder head and cylinder block assembly being adapted to be supported at the front end by means of a mounting bracket, the front cover arrangement comprising:

a front cover for attachment to the front end of the cylinder head and cylinder block assembly for covering the power transmitting mechanism;

said front cover having at a front surface central portion thereof an integral mounting seat for installation of the mounting bracket and at a rear surface central portion thereof an integral boss extending between said mounting seat and the front end of the cylinder head and cylinder block assembly; and bolting means for bolting said boss to the front end of the cylinder head and cylinder block assembly for thereby fastening said front cover to same together with the mounting bracket.

2. A front cover arrangement according to claim 1, further comprising a resilient member interposed between a peripheral end of said front cover and the front end of the cylinder head and cylinder block assembly.

3. A front cover arrangement according to claim 1, wherein said bolting means comprises a bolt which is commonly used for securing said boss and the mounting bracket to the front end of the cylinder head and cylinder block assembly.

4. A front cover arrangement according to claim 3, wherein said boss has a triangular prism-like shape and is formed with a plurality of bolt holes, and said bolting means comprises a plurality of bolts extending through the mounting bracket and said boss and screwed into the front end of the cylinder head and cylinder block assembly such that the mounting bracket is fastened to the front end of the cylinder head and cylinder block assembly by interposing therebetween said boss.

5. A front cover arrangement according to claim 4, wherein said front cover further has at the rear surface central portion thereof a second boss extending between a front surface central portion of said front cover other than that formed with said mounting seat and the front end of the cylinder head and cylinder block assembly, said second boss being located below said first mentioned boss.

6. A front cover arrangement according to claim 5, further comprising second bolting means for bolting said second mentioned boss to the front end of the cylinder head and cylinder block assembly.

7. A front cover arrangement according to claim 6, wherein said second boss has a cylindrical shape and a single bolt hole, and said second bolting means comprises a single bolt installed in said bolt hole of said second boss and screwed into the front end of the cylinder head and cylinder block assembly.

8. A front cover arrangement according to claim 1, further comprising a plurality of said bosses, said bosses each having a cylindrical shape and a bolt hole, said bolting means including a plurality of first bolts installed in said bolt holes for fastening said bosses to the front end of the cylinder head and cylinder block assembly and a plurality of second bolts for fastening the mounting bracket to said mounting seat.

9. A front cover arrangement according to claim 1, further comprising a single knock pin provided between a peripheral end of said front cover and the front end of the cylinder head and cylinder block assembly for positioning said front cover with respect to the front end of the cylinder head and cylinder block assembly.

10. A front cover arrangement in a transversely mounted type internal combustion engine, comprising:
- a cylinder head and cylinder block assembly of the engine;
- a power transmitting mechanism at a front end of said cylinder head and cylinder block assembly;
- a mounting bracket for installation on said front end of said cylinder head and cylinder block assembly;
- a front cover attached to said front end of said cylinder head and cylinder block assembly for covering said power transmitting mechanism;
- said front cover having at a front surface central portion thereof an integral mounting seat on which said mounting bracket is installed and at a rear surface central portion thereof an integral boss extending between said mounting seat and said front end of said cylinder head and cylinder block assembly; and
- bolting means for bolting said boss to said front end of said cylinder head and cylinder block assembly for thereby fastening said front cover to same together with said mounting bracket 11. A front cover arrangement in a transversely mounted type internal combustion engine, comprising:
- a cylinder head and cylinder block assembly of the engine;
- a power transmitting mechanism at a front end of said cylinder head and cylinder block assembly;
- a mounting bracket for installation on said front end of said cylinder head and cylinder block assembly;
- a front cover attached to said front end of said cylinder head and cylinder block assembly for covering said power transmitting mechanism;
- said front cover having at a front surface central portion thereof an integral mounting seat on which said mounting bracket is installed and at a rear surface central portion thereof a first integral boss extending between said mounting seat and said front end of said cylinder head and cylinder block assembly and a second integral boss extending between a front surface central portion of said front cover other than that formed with said mounting seat and said front end of said cylinder head and cylinder block assembly;
- a resilient member interposed between a peripheral end of said front cover and said front end of said cylinder head and cylinder block assembly; and
- bolting means for bolting said first and second bosses together with said mounting bracket to said front end of said cylinder head and cylinder block assembly for thereby supporting said front cover rigidly at said first and second bosses together with said mounting bracket and resiliently at said peripheral end upon said front end of said cylinder head and cylinder block assembly.

12. A front cover arrangement in a transversely mounted internal combustion engine, comprising:
- a cylinder head and cylinder block assembly of the engine;
- a power transmitting mechanism at a front end of said cylinder head and cylinder block assembly;
- a mounting bracket for installation on said front end of said cylinder head and cylinder block assembly;
- a front cover attached to said front end of said cylinder head and cylinder block assembly for covering said power transmitting mechanism;
- said front cover having at a front surface central portion thereof an integral mounting seat on which said mounting bracket is installed and at a rear surface central portion thereof a plurality of integral bosses extending between said mounting seat and said front end of said cylinder head and cylinder block assembly;
- a resilient member interposed between a peripheral end of said front cover and said front end of said cylinder head and cylinder block assembly;
- first bolting means for bolting said mounting bracket to said mounting seat; and
- second bolting means for bolting said bosses to said front end of said cylinder head and cylinder block assembly for thereby supporting said front cover rigidly at said bosses together with said mounting bracket and resiliently at said peripheral end upon said front end of said cylinder head and cylinder block assembly.

* * * * *